United States Patent [19]

Pasini et al.

[11] 4,359,748

[45] Nov. 16, 1982

[54] DEVICE AND METHOD OF NON IMPACT PRINTING

[75] Inventors: Arnaldo Pasini, Ivrea; Franco Knirsch, Banchette, both of Italy

[73] Assignee: Ing. C. Olivetti & C., S.p.A., Ivrea, Italy

[21] Appl. No.: 166,982

[22] Filed: Jul. 8, 1980

[30] Foreign Application Priority Data

Jul. 9, 1979 [IT] Italy ..................... 68420 A/79

[51] Int. Cl.³ .................... G01D 15/10

[52] U.S. Cl. .................... 346/76 PH; 118/257; 346/140 R; 400/120; 400/198

[58] Field of Search .......... 346/140 R, 139 C, 76 PH, 346/155, 162, 166; 400/120, 198, 197, 119; 101/336, DIG. 13; 118/257

[56] References Cited

U.S. PATENT DOCUMENTS 2,762,297 9/1956 Baer .................... 101/93.13
3,377,598 4/1968 Borman .................... 346/162
3,427,633 2/1969 Waterman .................... 346/162
3,550,153 12/1970 Haeberle .................... 346/165
3,719,261 3/1973 Heinzer .................... 346/76 PH X
3,752,288 8/1973 Detig .................... 346/155 X
3,989,569 11/1976 Newman .................... 118/257 X

*Primary Examiner*—Joseph W. Hartary
*Attorney, Agent, or Firm*—W. R. Hulbert

[57] ABSTRACT

A device for non impact printing of alpha-numeric characters on a sheet of normal paper, wherein an electrically conducting carrier is covered with an inking substance which is transferred to the paper by means of electrical pulses.

The inked carrier is movable and is disposed against the paper on the opposite side to a print head provided with a plurality of electrodes and movable with a translatory motion with respect to the paper. The inked carrier passes through an inking station in which a series of rollers take ink from a container and, with a metered action, spread it on the carrier, thus renewing the efficiency of the layer of ink.

6 Claims, 1 Drawing Figure

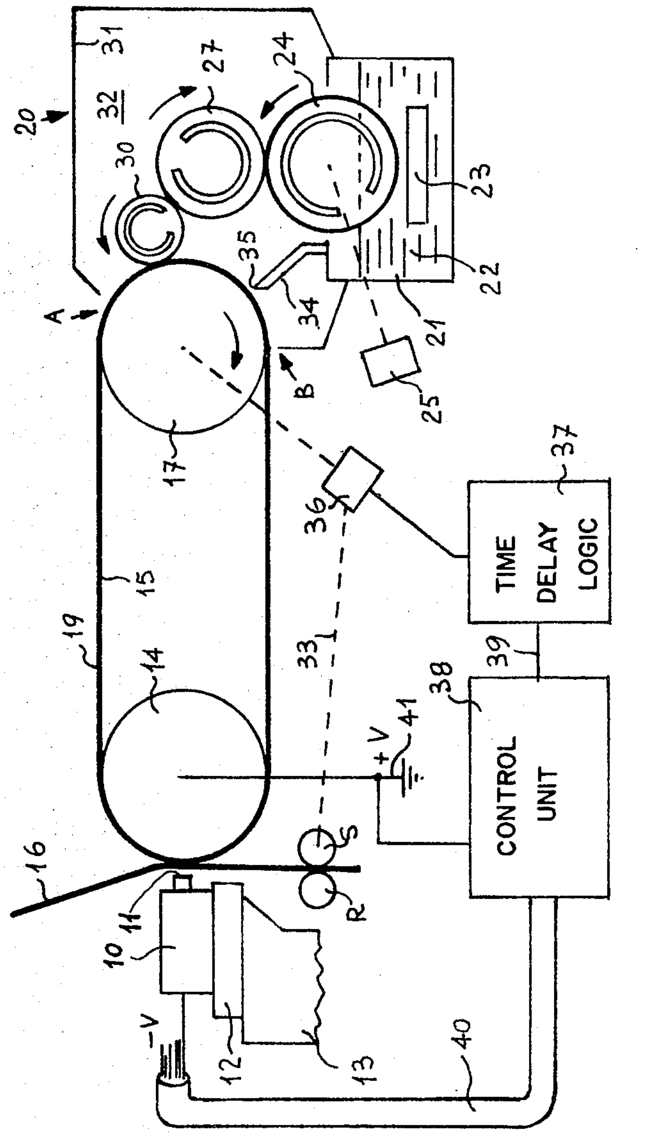
TIME
DELAY
LOGIC
CONTROL
UNIT
+V
-V
A
B
R
S
10
11
12
13
14
15
16
17
19
20
21
22
23
24
25
27
30
31
32
33
34
35
36
37
38
39
40
41

DEVICE AND METHOD OF NON IMPACT PRINTING

BACKGROUND OF THE INVENTION

The present invention relates to an impact-less printing device and process and more particularly an impact-less printing device with transfer of ink, of the type wherein an inking substance which is deposited on a movable carrier is transferred to the paper by means of selectively actuated printing elements which are arranged in contact with the sheet of paper on which printing is to be effected.

Various processes and devices for impact-less printing with transfer of ink are known; in one of these, which is described in U.S. Pat. No. 3,989,131 assigned to the same assignee, a print head carries a plurality of suitably spaced and aligned thermo-elements. The head is pressed against a sheet of normal paper with the interposition of a heat-sensitive inking ribbon which is displaced from a feed or unwinding spool to a receiving spool. Whenever a thermoelement is heated by means of a current pulse, a portion of transferrable material is softened and transferred from the ribbon on to the paper, to form a visible recording mark.

In another impact-less printing device of the above-indicated type as described in U.S. Pat. No. 3,570,380 assigned to the same Assignee, a ribbon bearing the apertured symbols to be printed is wound on a hollow transparent drum which is rotatable on two pairs of rollers. A thermographic ribbon which is covered with heat-transferrable material and which is fed from a feed spool passes between the covered surface of the drum and a co-operating roller, and is rewound on to a receiving spool. A sheet of normal paper is passed between the inking ribbon and the co-operating roller. A laser generator is arranged within the drum and selectively projects a beam of radiant energy through the openings of the perforated ribbon against the inking ribbon to transfer portions of inking substance on to the paper, by a thermal effect. In both the above-described known devices, the inking ribbon in each printing operation gives up a portion of inking material so that, once it has been used, it cannot be recovered and must be replaced.

Another process for impact-less printing of the above-mentioned type is that described in U.S. Pat. No. 3,550,153 wherein a sheet of normal paper is disposed above a nylon fabric impregnated with a mixture of alcohol and carbon powder. A pair of electrodes which are disposed on opposite sides with respect to the paper and the fabric are activated by a voltage pulse of the order of 350 volts for a period of 30 nanoseconds.

The electrical field which is thus generated between the two electrodes causes separation of electrified particles of carbon from the nylon fabric, and the transfer thereof onto the paper, at a position corresponding to the character which is formed in relief on the negative electrode. In this case also the carbon-impregnated fabric which is generally in ribbon form must be replaced after being used once, by another fresh ribbon.

U.S. Pat. No. 3,427,633 describes an electrostatic printing device wherein a support of inking material of regenerable type which is formed by a fabric ribbon closed in an annular or ring configuration and impregnated with ink is moved between the paper and the electrodes of a print head. In the return movement, in the direction of the motion, the ribbon passes into a regeneration container filled with pasty inking material which is spread on the ribbon by a blade. Subsequently, outside of the regeneration container, two pairs of rollers put the inking material into a uniform layer on the ribbon. This arrangement suffers from the disadvantage that irregular and more abundant spreading of ink by the blade can clog the rollers, producing therearound an excess of ink which can drip on to other important parts of the machine.

SUMMARY OF THE INVENTION

According to the invention, it is provided a non impact printing device which has better characteristics in regards to definition and contrast of the printed characters.

A further aim of the invention is to provide a non impact printing device with transfer of ink, which has a carrier for the ink which can be continuously regenerated thereby to avoid exhausting the ink and consequently replacing the carrier.

Another aim of the invention is to provide a non impact printing device with transfer of ink, which has a carrier for the ink which can be regenerated with the amount of ink that is strictly necessary thereby to avoid at any moment an excess of ink on the carrier.

The above-specified aims are achieved by the non impact printing device and the related process, as set forth in the attached claims.

These and other features will be clearly apparent from the following description which is given by way of non-limiting example, and the accompanying drawing which shows a diagrammatic view of the device according to the invention.

DESCRIPTION OF THE PREFERRED EMBODIMENT

Referring to the drawing, a print head 10 of electrostatic type comprises a plurality of electrodes which project from a plate 11 and which are aligned vertically and electrically insulated from each other. An example of a head of this type is described in U.S. Pat. No. 3,752,288 assigned to the same assignee, to which reference should be made for further details.

In particular, the head 10 is adapted for printing processes of series-parallel type, and consequently a certain number of heads of the indicated type are mounted on a carrier which is generally indicated by reference numeral 12, movable with respect to the fixed structure 13 of the machine along the print line.

In front of the print head 10 a roller 14 is rotatably mounted on the structure of the printing device, and has a double function: to support an inked web ribbon 15 and to act as a backing means for the information carrier or support 16 on which printing is to be effected, and which normally comprises single sheets or a strip of normal paper. The ribbon 15 is closed in a loop configuration, being passed around a rearward roller 17 which is of the same diameter as the roller 14, while the information carrier 16 passes between the head 10, in direct contact with the electrodes 11 and the ribbon 15, and is advanced by a pair of rollers R and S which are disposed below the roller 14, with the roller S being motor-driven, as will be seen hereinafter. The width of the ribbon 15 is at least equal to the length of the print line so that the rollers 14 and 17 must also be of equal length. The ribbon 15 is of steel of a thickness between 20 microns and 100 microns, but it may also comprise plastics material provided that it is capable of resisting a traction force and the continuous bending movements, while being electrically conducting with a low resistance.

The ink which covers the outside surface of the ribbon 15, in the form of a thin layer 19, is formed by a mixture which is semi-solid at ambient temperature, of finely subdivided carbon powder and artificial waxes, such as for example those formed by hydrocarbon waxes mixed with thermoplastic resins. A suitable composition for this use may be one of those described in cited U.S. Pat. No. 3,989,131. The thickness of the deposited layer of ink may vary between 10 and 100 microns, depending on the type of ink used.

Because, during the printing operation, a certain amount of ink is taken from the ribbon and transferred on to the paper, as a visible marking, it is necessary for the layer of ink on the ribbon 15 to be restored as the ribbon moves.

This is effected by a regeneration unit 20 comprising a container 21 containing a certain amount of ink 22 which is kept in a liquid condition by a heating means 23 which is thermostatically controlled to the typical fluidification temperature of the ink mixture used.

A pick-up roller 24 is partially immersed in the body of ink contained in the container 21 and is maintained in a condition of slow rotation by a motor 25. The ink which touches the lower part of the roller 24 partly adheres thereto and is transferred by the roller to an intermediate roller 27 which is disposed above and parallel to the roller 24 and which rotates at the same peripheral speed but in the opposite direction. The rollers 24 and 27 are held with their cylindrical surfaces at a certain distance, of the order of 0.3 to 0.5 mm, so as to flatten out the layer of ink passing therebetween and to limit the amount of ink which adheres to the roller 27.

A third roller 30 which is parallel to the rollers 24 and 27 and to the roller 17 is disposed between the roller 26 and the ribbon 15 in the region in which the ribbon is wound on the roller 17, and is so arranged that its cylindrical surface is spaced at about 0.2 mm from the cylinder 27. In addition, the cylindrical surface of the roller 30 is disposed at a spacing of the order of 50 to 100 microns from the surface of the ribbon 19, that spacing depending on the characteristics of the ink used.

In this way, the ink entrained by the roller 24 is transferred to the roller 27 which in turn transfers it to the roller 30 from which it is deposited on the ribbon 15 in a thin and controlled layer.

The rollers 24, 27 and 30 are heated internally so as to keep the ink in a fluid condition so as to facilitate transfer of the ink from the container 21 to the ribbon 15 on which the ink cools down and thus returns to the semi-solid state. A sheet metal cover 31 forms a closed chamber 32 in which the regeneration unit is disposed, for the purposes of keeping it in an environment at constant temperature, irrespective of the outside temperature. The roller 17 is partially inserted into the chamber 32 over the distance between A and B for keeping the ribbon 15 wound therearound at a temperature which is higher than the outside temperature in order to promote perfect spreading of the layer of ink deposited by the roller 30, over the ribbon.

Just before the point B at which the ribbon 15 leaves the chamber 32, a blade 34 which is fixed to the structure 31 of the regeneration unit is disposed adjacent the ribbon 15 so that the edge 35 thereof lightly touches the layer 19 of ink on the ribbon 15 in order definitively to control the thickness thereof and to remove any accidental excesses of ink which are passed by the roller 30.

Any excess of ink which is removed by the blade 34 falls back into the container 21 below the blade 34.

As already pointed out, in the series-parallel mode of operation a plurality of heads 10 in a side-by-side arrangement is disposed on the carrier 12 to provide a plurality of horizontal lines of electrodes extending along the print line. Successive energization of all the electrodes for writing a complete line may even take a few seconds, in the worst case, so that, in order to ensure that the line printed on the paper 16 is not inclined, the paper should be held stationary during each cycle of energization of the electrodes. Consequently, the ribbon 15 should also remain stationary during each energization cycle. Consequently, the roller 17 is mechanically connected to a stepping motor 36 which is controlled by a time-delay logic means 37 connected to a control unit 38 for controlling energization of the electrodes. The motor 36 is also connected mechanically in a manner known in the art and not described in detail herein, to the roller S for feeding the information carrier 16, by a connecting means indicated by reference numeral 33.

The time-delay logic means 37 and the control unit 38 will not be described in detail herein, insofar as they fall outside the scope of the present invention and are known per se in the art. It should only be noted in this respect that the logic means 37 receives synchronization signals from the control unit 38 by a line 39 and that the control unit 38 controls the electrodes 11 by passing voltage pulses thereto along a bundle of conductors 40.

In a particular embodiment which is not limiting in regards to the present invention, the voltage pulses applied to the print electrodes are of negative polarity, while the roller 14 which is of electrically conductive material is connected to the positive terminal, connected to the earth 41 of the equipment.

It will be appreciated that parts may be added to or restored to the above-described printing apparatus without thereby departing from the spirit of the invention as claimed hereinafter. For example, the electrodes may be arranged side-by-side in a single horizontal line and disposed at spacings according to the pitch of the point-type printing matrix, whereby the alpha-numeric printing operation is effected in a parallel arrangement along the entire line. In addition, the device may be controlled as a plotter so as to print diagrams or figures which have been recorded in advance.

What we claim is:

1. A thermal non impact printer for printing information on an information support, of the type in which an inking substance including carbon powder and a binder comprising artificial waxes is deposited on a movable carrier, said deposited substance being transferred from the carrier onto said information support under the heating action of a set of selectively energizable printing elements adjacent to said support, and a regeneration unit for renewing said inking carrier which is formed of a loop on a flexible ribbon, said unit including a pair of carrier feeding rollers and engaging said carrier to hold this latter in contact with said support, means for rotating at least one of said rollers for moving said carrier, a container for containing said inking substance, a plurality of mutually contacting inking rollers, a first one of said inking rollers being at least partially immersed in the inking substance of said container, another of said inking rollers being in contact with said carrier in correspondence of one of said carrier feeding rollers, means for continuously rotating said inking rollers to pick said inking substance from said container and meter same on said carrier, heating means for heating said inking substance on said container, and a chamber closed by said one carrier feeding roller for housing said container, said inking rollers and said heating means for keeping them substantially at a constant temperature inspective of the outside temperature.

2. A thermal non impact printer for printing information lines on an information support, of the type in which an inking substance including carbon powder and a binder comprising artificial waxes is deposited on a movable carrier, said deposited substance being transferred from the carrier onto said information support under the heating action of a set of selectively energizable printing elements adjacent to said support, and a regeneration unit for renewing said inking substance on said carrier, said carrier being formed of a loop of a flexible web having a width at least equal to the length of said line, said unit including a pair of carrier feeding rollers parallel to said line and engaging said carrier to hold this latter in contact with said support, means for intermittently rotating at least one of said rollers for moving said carrier across said line, a container for containing said inking substance, a plurality of mutually contacting inking rollers parallel to said carrier feeding rollers, a first one of said inking rollers being at least partially immersed in the inking substance of said container, another of said inking rollers being in contact with said carrier in correspondence of one of said carrier feeding rollers, means for continuously rotating said inking rollers to pick said inking substance from said container and meter same on said carrier, heating means for heating said inking substance on said container, and a chamber closed by said other carrier feeding roller for housing said container, said inking rollers and said heating means for keeping them substantially at a constant temperature inspective of the outside temperature.

3. A printer according to claim 2, wherein said elements are carried by a printing head transversely movable with respect to said support, said intermittently moving means being adapted to move said support simultaneously with said carrier feeding rollers.

4. A printer according to claim 2, wherein said unit also comprises a third inking roller located in a position intermediate between said first inking roller and said other inking roller, and means for heating said inking rollers for spreading said inking substance over said carrier in a substantially melted condition.

5. A printer according to claim 2, wherein said printing elements are arranged to contact said support, the other one of said carrier feeding rollers keeping said carrier in contact with said support directly opposite to said printing elements.

6. A printer according to claim 5, wherein said printing elements are adapted selectively to print dots according to a predetermined matrix and are formed of a set of electrodes in contact with said support, said carrier and said other carrier feeding rollers being made of conductive material to act as a common counterelectrode for said electrodes, said electrodes when actuated causing an electric current to flow through said carrier to melt locally said inking substance and cause same to be transferred onto said support.

* * * * *